Feb. 18, 1958     R. S. BEVERLIN     2,823,843
STORAGE BATTERY BOX
Filed April 26, 1957
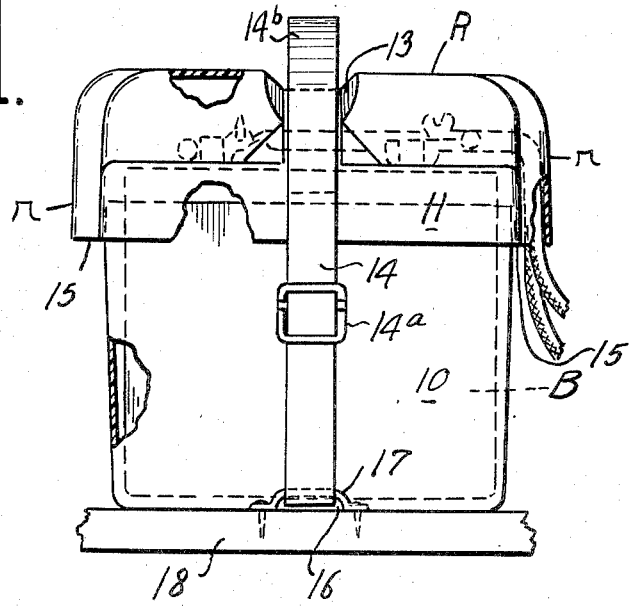
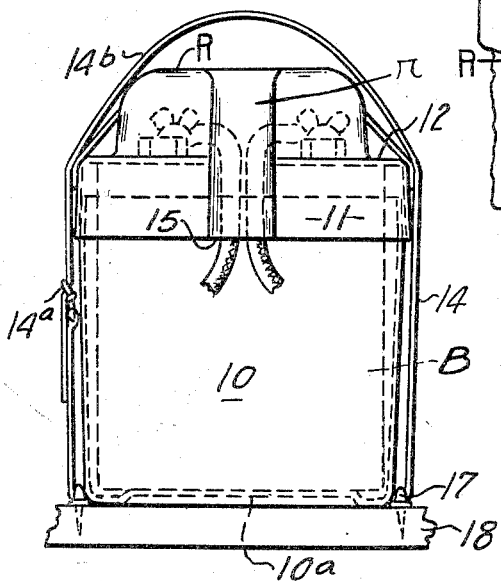
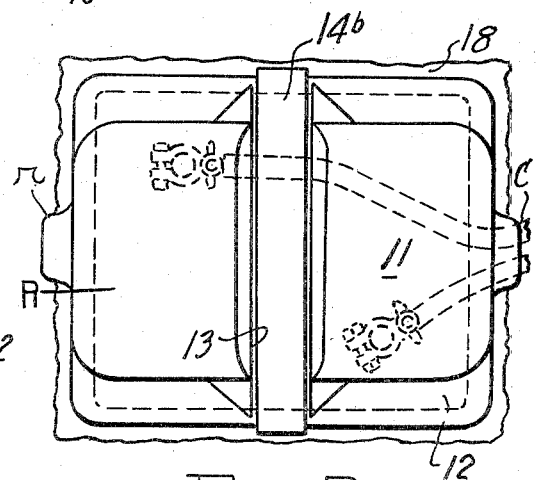
INVENTOR.
Robert S. Beverlin
BY
ATTORNEY United States Patent Office 2,823,843
Patented Feb. 18, 1958

2,823,843

STORAGE BATTERY BOX

Robert S. Beverlin, Toledo, Ohio, assignor to The City Auto Stamping Company, Toledo, Ohio, a corporation of Ohio Application April 26, 1957, Serial No. 655,354

6 Claims. (Cl. 224—49)

This invention relates to containers for storage batteries, and an object is to produce a new and improved container of this character which is sturdy in construction; is water and chemical resistant; firmly engages the battery to hold it from relative movement; is formed with novel cable channels so that the cables are shielded from the outside; has a device for retaining the cover and body of the container clamped to the battery as well as affording a convenient carrying device for the container and battery; and has the unique features of construction, arrangement and choice of materials hereinafter described.

Other objects and advantages of the invention will hereinafter appear, and for purposes of illustration but not of limitation, an embodiment of the invention is shown on the accompanying drawings, in which—

Figure 1 is a side elevation of the battery box, showing the same strapped to a support;

Figure 2 is a top plan view of the box shown in Figure 1; and

Figure 3 is an end elevation of the battery box.

The illustrated embodiment of the invention comprises a box and cover for the same to contain a storage battery, the component parts being formed of a suitable plastic reinforced with glass fibers. Such structure lends itself admirably for use in this connection because of its lightness in weight and its resistance not only to water but to chemicals as well, thereby affording an exceedingly satisfactory protection for the storage battery. In the form shown, the box has a body 10 which is of oblong rectangular shape, having a closed bottom, the central portion of which, or that portion on which the battery rests, being raised from the peripheral portions, as indicated at 10a. The body of the box 10 has side walls which flare outwardly from the bottom and an open top over which is adapted to fit a cover 11.

The storage battery fits freely into the box body 10 and, particularly as shown in Figures 1 and 3, the upper portion of the battery B projects upwardly beyond the rim or mouth of the box. The depending sides of the cover extend downwardly substantially below or overlap the top edge or rim of the box. However, the cover 11 does not seat on the rim of the box but instead, it is provided with shoulders 12 which are integrally formed in the cover and bear against the edge portions of the battery B, particularly the battery casing. Thus the shoulders 12 are disposed on opposite sides of the cover and engage the major portion of the top portion of the battery and, as shown, the shoulders extend inwardly a substantial distance from the adjacent side edges of the cover. This leaves the central portion R of the cover of somewhat raised and of dome-shape to afford adequate space for the battery terminals and also to afford space for the terminal engaging cables C, as well as the clamping devices carried by these cables.

Extending transversely of the central portion of the cover 11 is a relatively deep channel 13, opposite sides of which taper upwardly and outwardly to facilitate the application of a clamping strap 14 having a buckle 14a. The strap extends around the bottom of the box body 10 and urges the cover against the top portion of the battery B and thereby clamping the battery securely in position. The raised bottom 10a of the box, due to the nature of the plastic material, affords a certain amount of resiliency so that the battery is thus clamped in place and the resiliency of the raised bottom of the box affords a certain amount of spring tension to insure the proper clamping action. It will be observed that the strap has a carrying loop 14b which is suitably secured to the strap and provides a convenient hand hold for carrying the assembly from place to place. Also for holding the strap 14 in the desired position, there is centrally disposed transverse groove 16 in the bottom wall of the box body 10, thus insuring that the strap is at all times properly arranged both top and bottom, to apply the proper clamping pressure against the battery.

At opposite ends of the cover 11 between adjacent shoulders 12 are integral outwardly arched ridges R forming centrally arranged downwardly extending channels 15 which are closed at the top and which are open at the bottom ends, the latter being flush with the lower edge of the cover. The channels 15 enable the battery cables C to extend from the storage battery B. As shown, both cables may extend through a single channel 15, or if desired, one cable may lead through one of the channels 15 and the other cable through the other. The channels 15 militate against rain as well as dust and foreign particles from entering inside of the box and damaging the storage battery.

As shown, the assembly is mounted on a support 18, and to hold the same securely in place upon the support, a pair of staples 17 are screwed into the support and the strap run through these staples. In this manner, the assembly can be conveniently mounted, for example, on the floor of a boat.

Although a box of the above description can be used in many locations, it has particular usefulness in a boat where ordinarily the battery is exposed to the elements. By mounting the storage battery as above described, it is adequately protected from the elements as well as chemicals which may be present. It enables the battery to be securely lashed, and liability of it sliding out of the desired position is prevented. Manifestly, the device simplifies the ordinarily difficult matter of transporting a storage battery from place to place. By this construction, a convenient carrying device is provided and at the same time, the storage battery is protected from damage during transit.

This application constitutes a continuation-in-part of my copending application, Serial No. 466,923, filed November 4, 1954, and entitled "Storage Battery Box."

It is to be understood that numerous changes in details of construction, arrangement and choice of materials may be effected without departing from the spirit of the invention, especially as defined in the appended claims.

What I claim is:

1. A battery box comprising a molded plastic box having side walls and an open top, a raised resilient bottom wall for the box, said box being adapted to contain a storage battery seated in said resilient bottom wall with its upper portion projecting above the side walls, a cover for said box, integral shoulder means on said cover adapted to seat against the peripheral portion of the storage battery, an integral battery cable-receiving channel in a side portion of the cover having an opening at the bottom end and being closed at the upper end, flexible strap means extending about the bottom of the box and the cover thereby to clamp the battery in place, and an integral channel in the central portion of the cover receiving the strap thereby to enable the latter to urge the storage battery firmly against the resilient bottom wall of the box.

2. A battery box comprising a molded plastic box having side walls and an open top, a raised resilient bottom wall for the box, said box being adapted to contain a storage battery seated in said resilient bottom wall with its upper portion projecting above the side walls, a cover for said box, integral shoulder means on said cover adapted to seat against the peripheral portion of the storage battery, said cover having side portions extending downwardly thereon overlapping the side walls of the box, an integral battery cable-receiving channel in a side portion of the cover having an opening at the bottom end and being closed at the upper end, flexible strap means extending about the bottom of the box and the cover thereby to clamp the battery in place, an integral transverse channel in the central portion of the cover, for receiving the strap, and an integral channel on the bottom wall of the cover also to receive the strap thereby to maintain the strap in centered position, and a carrying loop secured to the strap and extending above the cover.

3. A battery box comprising a molded plastic box having side walls and an open top, a raised resilient bottom wall for the box, said box being adapted to contain a storage battery seated in said resilient bottom wall with its upper portion projecting above the side walls, a cover for said box, integral shoulder means on said cover adapted to seat against the peripheral portion of the storage battery, said cover having side portions extending downwardly thereon and overlapping the side walls of the box, an integral channel at opposite ends of the cover closed at the top and open at the bottom thereby to afford passage for the battery cables, an integral battery cable-receiving channel in a side portion of the cover having an opening at the bottom end and being closed at the upper end, flexible strap means extending about the bottom of the box and the cover thereby to clamp the battery in place, an integral transverse channel in the central portion of the cover, for receiving the strap, and an integral channel on the bottom wall of the cover also to receive the strap thereby to maintain the strap in centered position, and a carrying loop secured to the strap and extending above the cover.

4. A battery container comprising a molded plastic box having a bottom and side walls and an open top, said box being adapted to contain a storage battery seated on the bottom wall with its upper portion projecting above said side walls; a cover for the box, said cover having side walls outwardly overlapping the side walls of the box, integral shoulders extending inwardly from the side walls of the cover adapted to seat against the top of the battery adjacent edges thereof, an integral raised portion adapted to overlie and house the storage battery terminals, and an integral channel depression extending across the raised portion providing a strap guide; and a flexible strap extending about the bottom and cover to clamp the cover downwardly against the top of the battery.

5. A battery container comprising a molded plastic box having a bottom and side walls and an open top, said box being adapted to contain a storage battery seated on the bottom wall with its upper portion projecting above said side walls; a cover for the box, said cover having side walls outwardly overlapping the side walls of the box, integral shoulders extending inwardly from the side walls of the cover adapted to seat against the top of the battery adjacent edges thereof, an integral raised portion adapted to overlie and house the storage battery terminals, and an integral channel depression extending across the raised portion providing a strap guide, and a flexible strap extending about the bottom and cover to clamp the cover downwardly against the top of the battery; one of the side walls of the cover having an integral outwardly arched ridge thereon providing a battery cable-receiving channel open at the bottom and leading to the interior of the cover.

6. A battery container comprising a molded plastic box having a bottom and side walls and an open top, said box being adapted to contain a storage battery seated on the bottom wall with its upper portion projecting above said side walls; a cover for the box, said cover having side walls outwardly overlapping the side walls of the box, integral shoulders extending inwardly from the side walls of the cover adapted to seat against the top of the battery adjacent edges thereof, and an integral raised portion adapted to overlie and house the region occupied by the storage battery terminals, and an integral channel depression extending across the raised portion providing a strap guide; and a flexible strap extending about the bottom and cover to clamp the cover downwardly against the top of the battery; one of the side walls of the cover having an integral, outwardly bowed ridge thereon, the top of said ridges merging with the raised portion of the cover, said ridge and raised portion providing a battery cable receiving channel open at the bottom of the ridge and leading to the region which said raised portion overlies.

References Cited in the file of this patent

UNITED STATES PATENTS

| | | |
|---|---|---|
| 978,251 | Whitney | Dec. 13, 1910 |
| 2,092,110 | Doggett | Sept. 7, 1937 |
| 2,614,727 | Robinson | Oct. 21, 1952 |
| 2,780,259 | Nalle | Feb. 5, 1957 |

FOREIGN PATENTS

| | | |
|---|---|---|
| 102,236 | Great Britain | Nov. 23, 1916 |